No. 817,678. PATENTED APR. 10, 1906.
W. H. SMITH.
VEHICLE BRAKE.
APPLICATION FILED SEPT. 2, 1905.
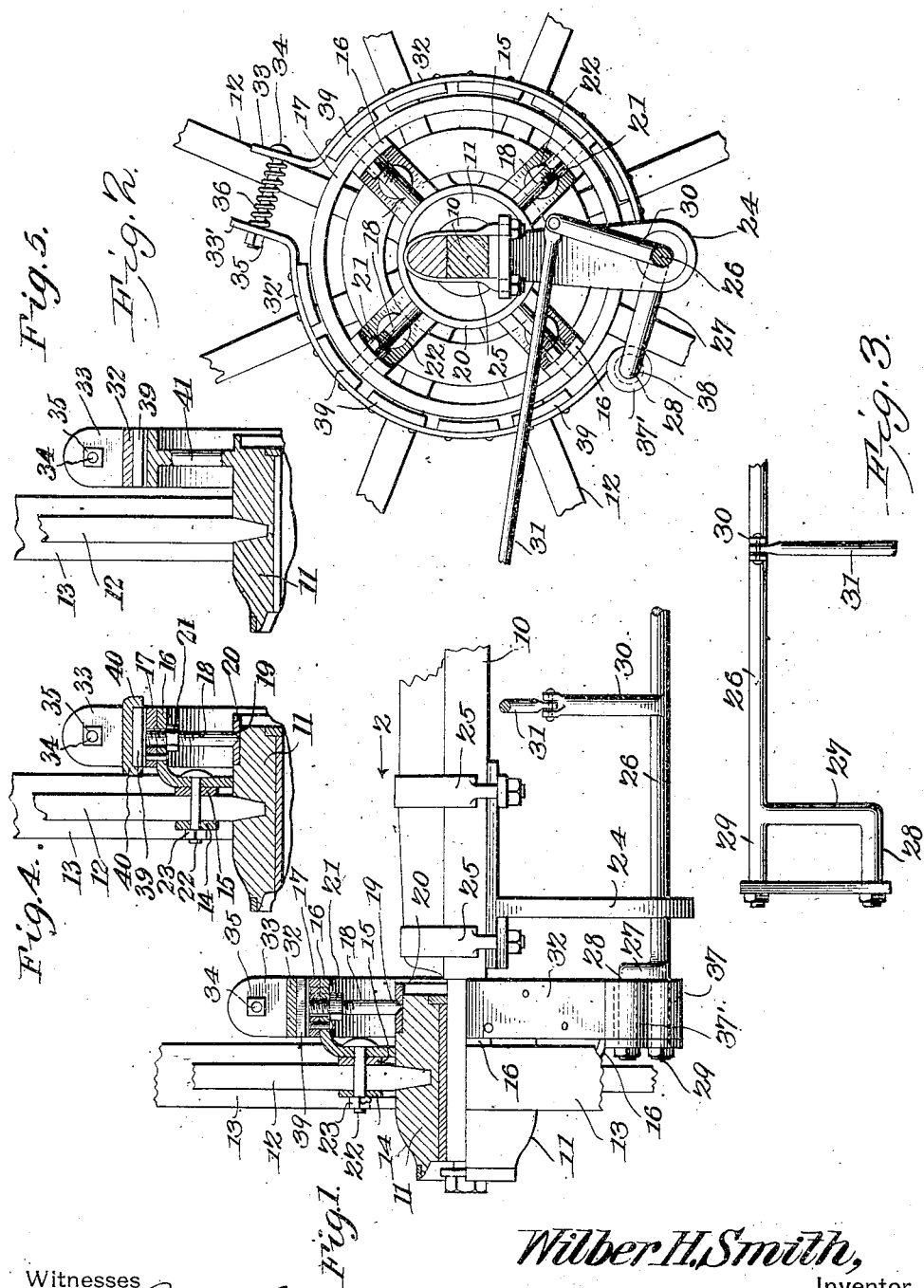
Witnesses
Wilber H. Smith,
Inventor
by
Attorneys

UNITED STATES PATENT OFFICE.

WILBER H. SMITH, OF BAR HARBOR, MAINE.

VEHICLE-BRAKE.

No. 817,678.　　　　Specification of Letters Patent.　　　　Patented April 10, 1906.

Application filed September 2, 1905. Serial No. 276,845.

*To all whom it may concern:*

Be it known that I, WILBER H. SMITH, a citizen of the United States, residing at Bar Harbor, in the county of Hancock and State of Maine, have invented a new and useful Vehicle-Brake, of which the following is a specification.

This invention relates to vehicle-brakes, and has for an object to provide a brake mechanism embodying new and improved features of adaptability, durability, simplicity, and efficiency.

A further object of the invention is to provide a band-brake mechanism the band-rim of which may be conveniently and readily applied to a wheel of ordinary construction and be accurately centered thereon.

A further object of the invention is to provide a band-brake mechanism the band and operating means of which may be readily and quickly applied to an axle of ordinary construction and in position to coöperate with a band-rim secured to the wheel.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit of the invention or sacrificing any of its advantages.

In the drawings, Figure 1 is a side view of the improved vehicle-brake, partly in section and partly in elevation. Fig. 2 is a view of the improved brake in end elevation seen as indicated by arrow 2. Fig. 3 is a plan view of the brake-tightening device. Fig. 4 is a detail sectional view of a modification wherein the friction-bands are formed with flanges along the edges to retain the wear material. Fig. 5 is a detail sectional view of a modification wherein the hub and band are formed integral.

Like characters of reference designate corresponding parts throughout the several views.

The improved vehicle-brake forming the subject-matter of this application is adapted to be applied to a vehicle of ordinary construction having the axle 10, hub 11, spokes 12, and tire 13.

In its preferred embodiment the brake comprises a pair of rings 14 and 15, secured upon opposite sides of the spokes and encircling the hub. Secured to or integral with the ring 15 are the knee members 16, and secured to or integral with the knees is the band-rim 17. The knees 16 are provided with openings in which are disposed one end of the screw-threaded arms 18, the other ends of which are pointed, as at 19, and bear in countersunk apertures in the band 20 of the hub. Upon the arms 18 are disposed the jam-nuts 21, which bearing against the band-rim 17 move the rim to a position exactly concentric with the hub. Through the knees 16 and the rings 14 and 15 extend the bolts 22, and nuts 23 thereon clamp the rings rigidly upon the spokes and with the band-rim centered.

To the under side of the axle 10 is secured the hanger 24, as by the clips 25, and therein is journaled the shaft 26. The shaft has at the end adjacent the hub an arm 27, disposed at an angle to the shaft and bent to form the trunnion 28, parallel with the trunnion 29, which forms a continuation of the shaft. The shaft 26 carries a lever 30, disposed approximately at right angles to the arm 27, and thereto is pivotally connected the rod 31, leading to a brake-operating lever or other mechanism.

About the band-rim 17 is disposed the band 32 32', formed in sections, with the ears 33 33' upstanding. Through the ears is disposed a bolt 34, with a tension-nut 35 thereon and with a spring 36 between the ears and encircling the bolt. At the free ends opposite the ears the sections are provided with eyes 37 37', in which are disposed the trunnions 28 and 29. Within the eyes and surrounding the trunnions is preferably disposed the elastic bushings 38 to serve as antirattlers, and wear-plates 39, of wood, leather, or other elastic material, are secured to the band for frictional contact with the band-rim.

Instead of forming the friction-bands as curved sheets the edges may be turned to form flanges, as at 40, to prevent the displacement of the wear material and permit the more convenient use of wood blocks.

As shown in Fig. 5, the band-rim 17 may be formed integral with the hub, whereby the rings 14 and 15, knees 16, and adjustable arms 18 are replaced by the spoke-like arms 41.

From the foregoing description it will be understood that a pull upon the rod 31 will move the trunnion 28 angularly about the shaft 26 and trunnions 29 and tighten the band, so that the wear-plates 39 contact with the band-rim and, the trunnion 29 being held from rotating with the rim by the hanger 24, the band exerts a frictional grip upon the rim in the usual well-known manner of band-brakes.

Having thus described the invention, what is claimed is—

1. The combination with a vehicle-wheel of a band-rim secured to the spokes thereof and about the hub, and adjustable reinforcing and centering devices interposed between the rim and hub.

2. The combination with a vehicle-wheel, of a band-rim secured to the spokes thereof, and threaded arms detachably seated upon and radiating from the hub of the wheel, said arms adjustably engaging and centering and reinforcing the rim-band.

3. The combination with a vehicle-wheel, of a band-rim secured to the spokes of the wheel, threaded arms detachably seated upon and radiating from the hub of the wheel, said arms detachably engaging, and centering and reinforcing the band-rim, a resiliently-connected split band embracing the rim and means for clamping the band upon the rim.

4. The combination with a vehicle-wheel, of a band-rim secured to the spokes of the wheel, combined reinforcing and centering devices radiating from the hub of the wheel and surrounded by and detachably secured to the band-rim, a split band embracing the rim, a resilient connection between the parts of the band, and means for clamping the band upon the rim.

5. The combination with a wheeled vehicle, of rings upon opposite sides of the spokes of a wheel and about the hub, a band-rim carried by one of the rims and concentric therewith, screw-threaded arms disposed radially between the rim and hub, jam-nuts upon the arms and bearing against the rim, a band about the rim, a hanger rigidly secured to the axle, a bifurcated shaft journaled in the hanger and with its arms secured to the free ends of the band, a lever rigid with the shaft and means for moving the lever angularly.

In testimony that I claim the foregoing as my own I have hereto affixed my signature in the presence of two witnesses.

WILBER H. SMITH.

Witnesses:
GEORGE E. CLARK,
JOHN A. HOPKINS.